US011435056B1

(12) United States Patent
Zhu

(10) Patent No.: US 11,435,056 B1
(45) Date of Patent: Sep. 6, 2022

(54) COMBINATION CAMP LANTERN AND IMAGE PROJECTOR

(71) Applicant: Jian Zhu, Fort Worth, TX (US)

(72) Inventor: Jian Zhu, Fort Worth, TX (US)

( * ) Notice: Subject to any disclaimer, the term of this patent is extended or adjusted under 35 U.S.C. 154(b) by 0 days.

(21) Appl. No.: 17/370,639

(22) Filed: Jul. 8, 2021

Related U.S. Application Data

(60) Provisional application No. 63/050,302, filed on Jul. 10, 2020.

(51) Int. Cl.
| | |
|---|---|
| *F21V 3/04* | (2018.01) |
| *F21V 21/40* | (2006.01) |
| *F21V 23/04* | (2006.01) |
| *G03B 21/20* | (2006.01) |
| *F21W 131/10* | (2006.01) |
| *F21Y 115/10* | (2016.01) |

(52) U.S. Cl.
CPC ........... *F21V 3/049* (2013.01); *F21V 21/406* (2013.01); *F21V 23/0414* (2013.01); *G03B 21/2033* (2013.01); *F21W 2131/10* (2013.01); *F21Y 2115/10* (2016.08)

(58) Field of Classification Search
CPC .... F21V 3/049; F21V 21/406; F21V 23/0414; G03B 21/2033; F21Y 2115/10; F21W 2131/10
USPC ........................................................ 362/159
See application file for complete search history.

(56) References Cited

U.S. PATENT DOCUMENTS

| | | | |
|---|---|---|---|
| 2,788,439 A | 4/1957 | Hesse | |
| 5,517,264 A | 5/1996 | Sutton | |
| 5,938,318 A | 8/1999 | Mattsen | |
| 6,183,115 B1 | 2/2001 | Durando | |
| 8,128,274 B2 | 3/2012 | Chien | |
| 8,545,090 B2 | 10/2013 | Chien | |
| 9,405,175 B2 | 8/2016 | Garlington et al. | |
| 2003/0107497 A1* | 6/2003 | Krenz | G08B 5/36 340/815.4 |
| 2012/0188451 A1 | 7/2012 | Schmidt et al. | |
| 2018/0187876 A1* | 7/2018 | Sutton | F21V 23/04 |
| 2019/0257479 A1* | 8/2019 | Horne | F21K 9/237 |

* cited by examiner

*Primary Examiner* — Andrew J Coughlin
*Assistant Examiner* — Jessica M Apenteng
(74) *Attorney, Agent, or Firm* — Kenneth L. Tolar

(57) ABSTRACT

A camp lantern includes a housing having an outer wall, a lower surface, and an upper surface with an LED module positioned thereon. A U-shaped handle attached to opposing sides of the outer wall allows the lantern to be easily transported to remote locations. Removably superimposable on the LED module is a frosted, semispherical cover that allows the lantern to be used as a portable light source. Any one of a plurality of interchangeable, substantially opaque covers with transparent, thematic design elements can be substituted for the frosted cover to convert the camping lantern to an image projector. When the LED module is activated, light only passes through the transparent portions to project the design elements onto a tent or cabin ceiling.

13 Claims, 6 Drawing Sheets

COMBINATION CAMP LANTERN AND IMAGE PROJECTOR

CROSS REFERENCE TO RELATED APPLICATIONS

This application claims priority of provisional application No. 63/050,302 filed on Jul. 10, 2020, the specification of which is incorporated herein by reference.

BACKGROUND OF THE INVENTION

The present invention relates to a camp lantern that is easily convertible to an image projector for entertaining campers.

DESCRIPTION OF THE PRIOR ART

Camping is a popular outdoor activity enjoyed by both adults and families. A common camping accessory is a lantern that provides a portable light source for assisting a camper with performing routine tasks or reading. Conventional camp lanterns are only capable of illuminating a surrounding area and cannot also function as an entertainment device. If campers wish to be entertained while camping, additional amusement devices must be transported, which is burdensome and inconvenient. Furthermore, many portable amusement devices require a separate power source that must somehow be recharged in addition to the camp lantern. Accordingly, there is currently a need for a camping lantern that can both entertain a camper and illuminate a surrounding area.

The prior art is devoid of camping lanterns that can also function as an entertainment device. For example. U.S. Pat. No. 6,183,115 issued to Durando discloses an image-projecting lampshade including a lens mounted on the shade frame that focuses light onto a ceiling.

U.S. Pat. No. 2,788,439 to Hesse discloses a portable dome light for conspicuously identifying people in dangerous situations.

U.S. Pat. No. 5,938,318 issued to Mattsen discloses a novelty lamp including a light source received within a protective enclosure. The light source is surrounded by liquid containing bits of meltable wax. When a heat source melts the wax, it obstructs the light source to project shadows onto nearby walls.

U.S. Pat. No. 5,517,264 issued to Sutton discloses a projector night light that resembles a TV having a display screen that depicts an image and projects it onto a ceiling.

U.S. Pat. No. 8,128,274 issued to Chien discloses an image-projecting night light including a lens with openings having a desired shape. An internal light transmits a light beam through the openings to project the shape onto a ceiling.

U.S. published patent application no. 2012/0188451 to Schmidt discloses a child projector including a dome-shaped cover and an internal digital projector that displays animated scenes on a ceiling. The device may also include a decorative border having cutouts for displaying images on surrounding walls.

As indicated above, several image-projecting lights exist in the prior art. For example, though Chien and Schmidt disclose lights with covers having decorative cutouts for projecting images onto a ceiling, they are exclusively a night light and a projector, respectively, and cannot also function as a portable camping lantern. The present invention is a portable, battery-powered lantern having a frosted dome and a multitude of interchangeable opaque domes that each include discrete transparent portions resembling design elements. Therefore, when the frosted dome is superimposed on a light module, the device functions as a conventional portable light source. By substituting one of the opaque domes for the frosted dome, the device is converted to a novelty image projector that depicts an indeterminate number of lighted images on a ceiling or other overhead surface.

SUMMARY OF THE INVENTION

The present invention relates to a camp lantern including a housing having an outer wall, a lower surface, and an upper surface with an LED module positioned thereon. A U-shaped wire handle attached to opposing sides of the outer wall allows the lantern to be easily transported to remote locations. Removably superimposable on the LED module is a frosted, semispherical cover that allows the lantern to be used as a portable light source. Any one of a plurality of interchangeable, substantially opaque covers with transparent thematic design elements can be substituted for the frosted cover to convert the camping lantern to an image projector. When the LED module is activated, light only passes through the transparent portions to project the design elements onto a tent or cabin ceiling.

It is therefore an object of the present invention to provide a camp lantern that is convertible to an entertaining image projector.

It is therefore another object of the present invention to provide a camp lantern having a plurality of interchangeable covers, each having unique design elements formed thereon.

It is yet another object of the present invention to provide a camp lantern having interchangeable covers that can be quicky and easily interchanged.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
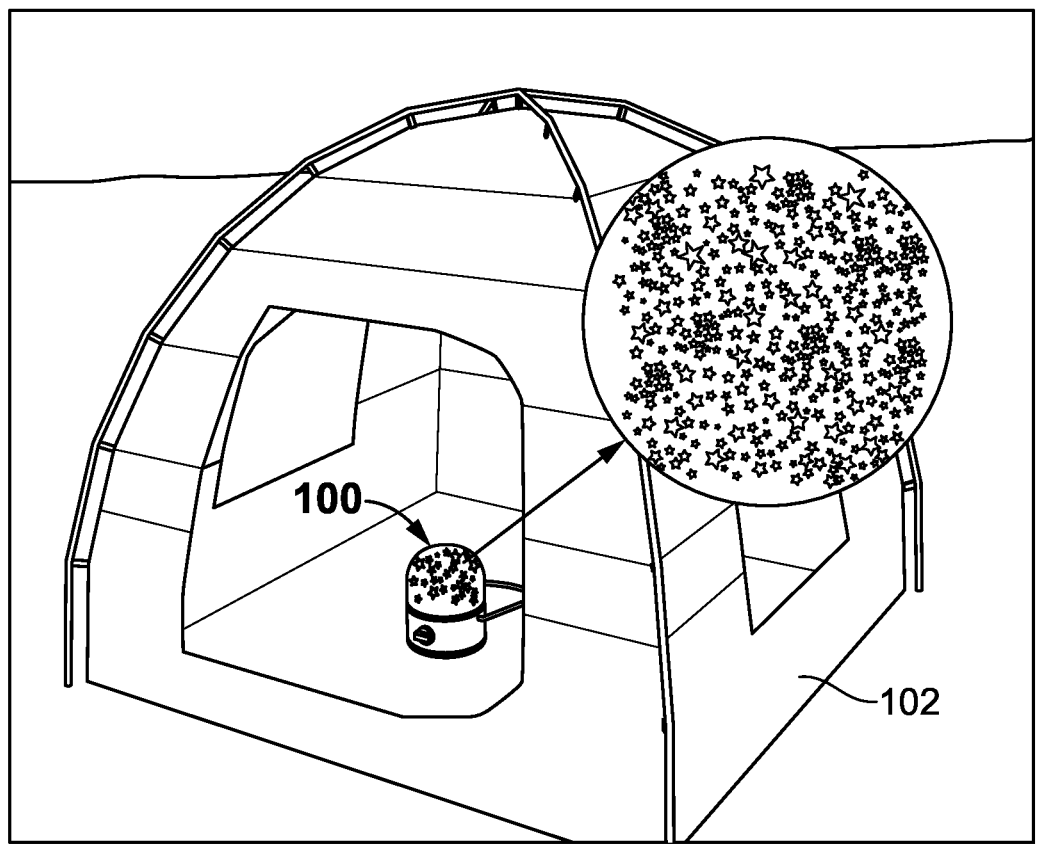
FIG. 1 depicts the camping lantern according to the present invention being used in a tent.
Figure 2:
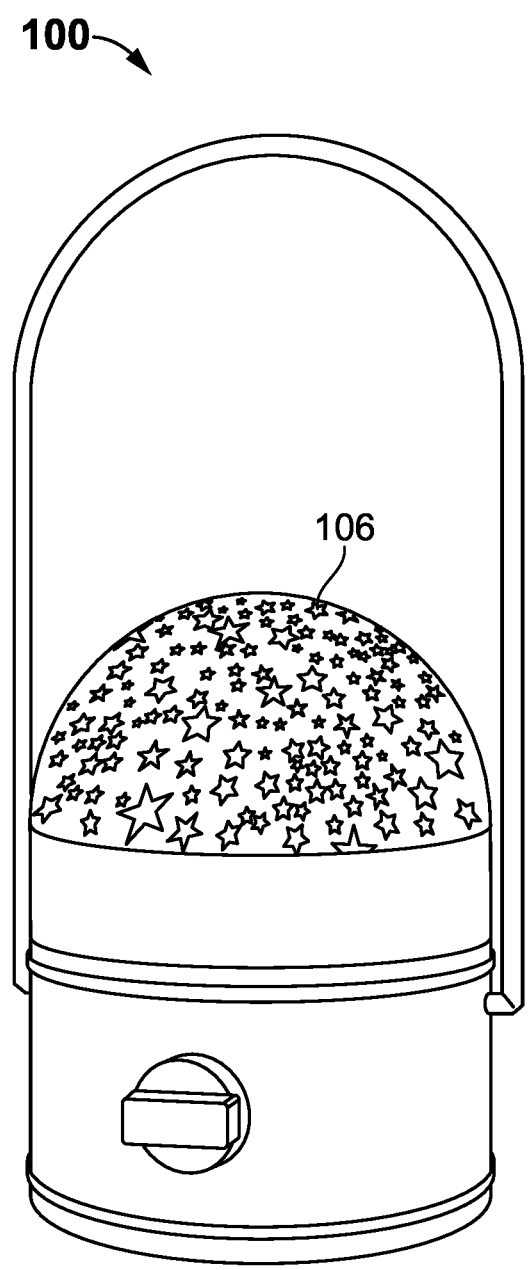
FIG. 2 is an isolated view of the camp lantern depicted in FIG. 1.
Figure 3:
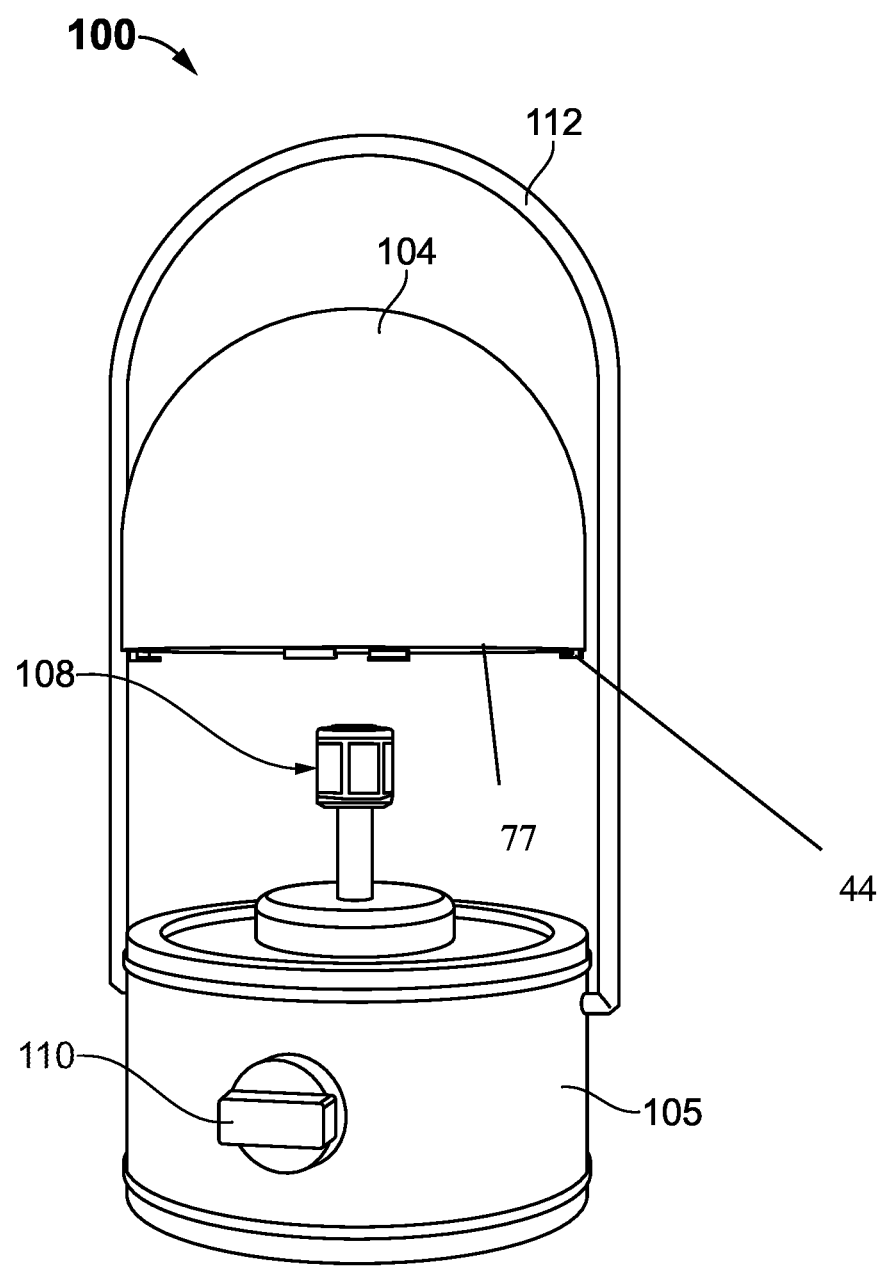
FIG. 3 is a perspective, exploded view of the camp lantern and frosted cover.
Figure 4:
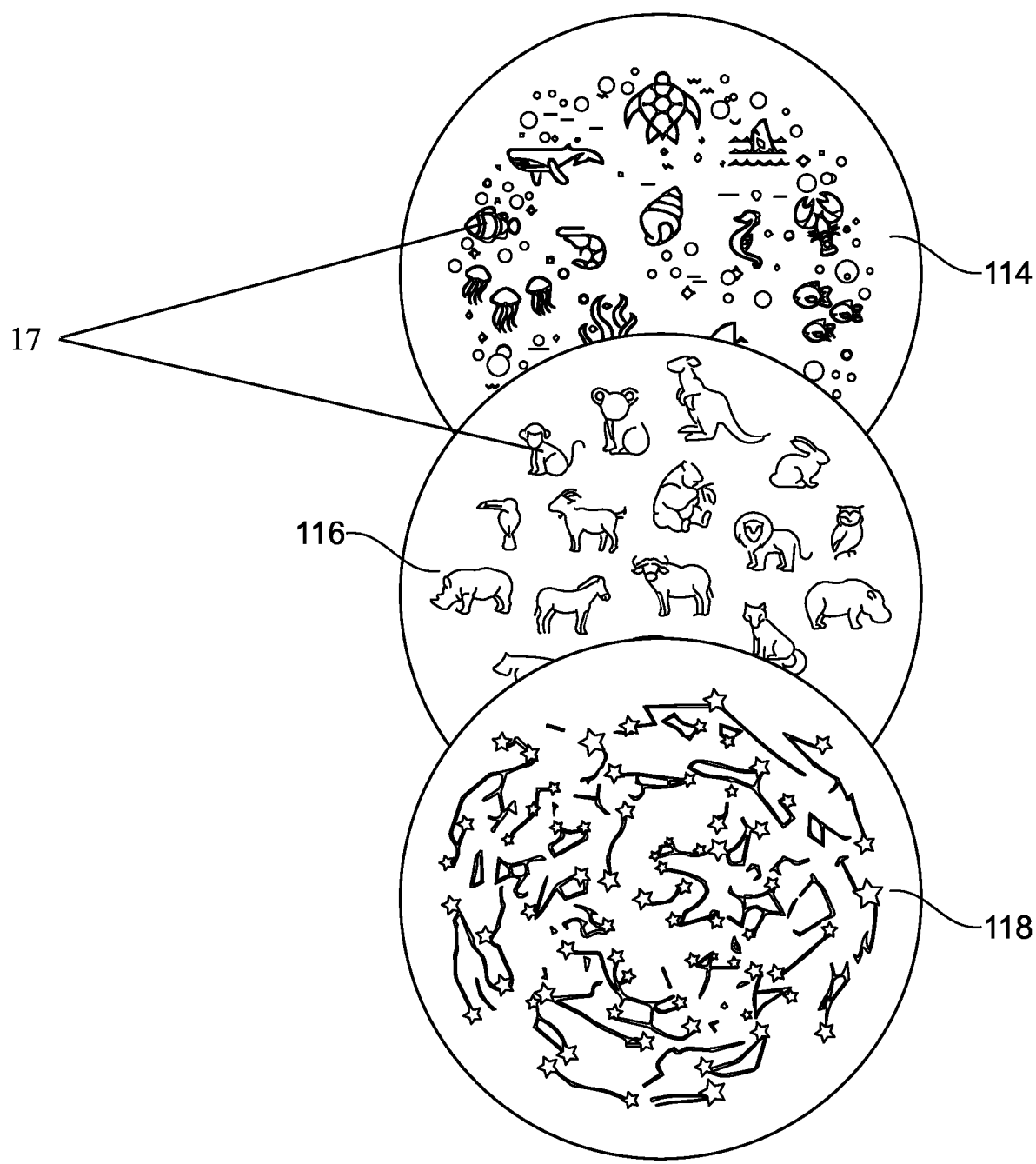
FIG. 4 depicts exemplary decorative covers.
Figure 5:
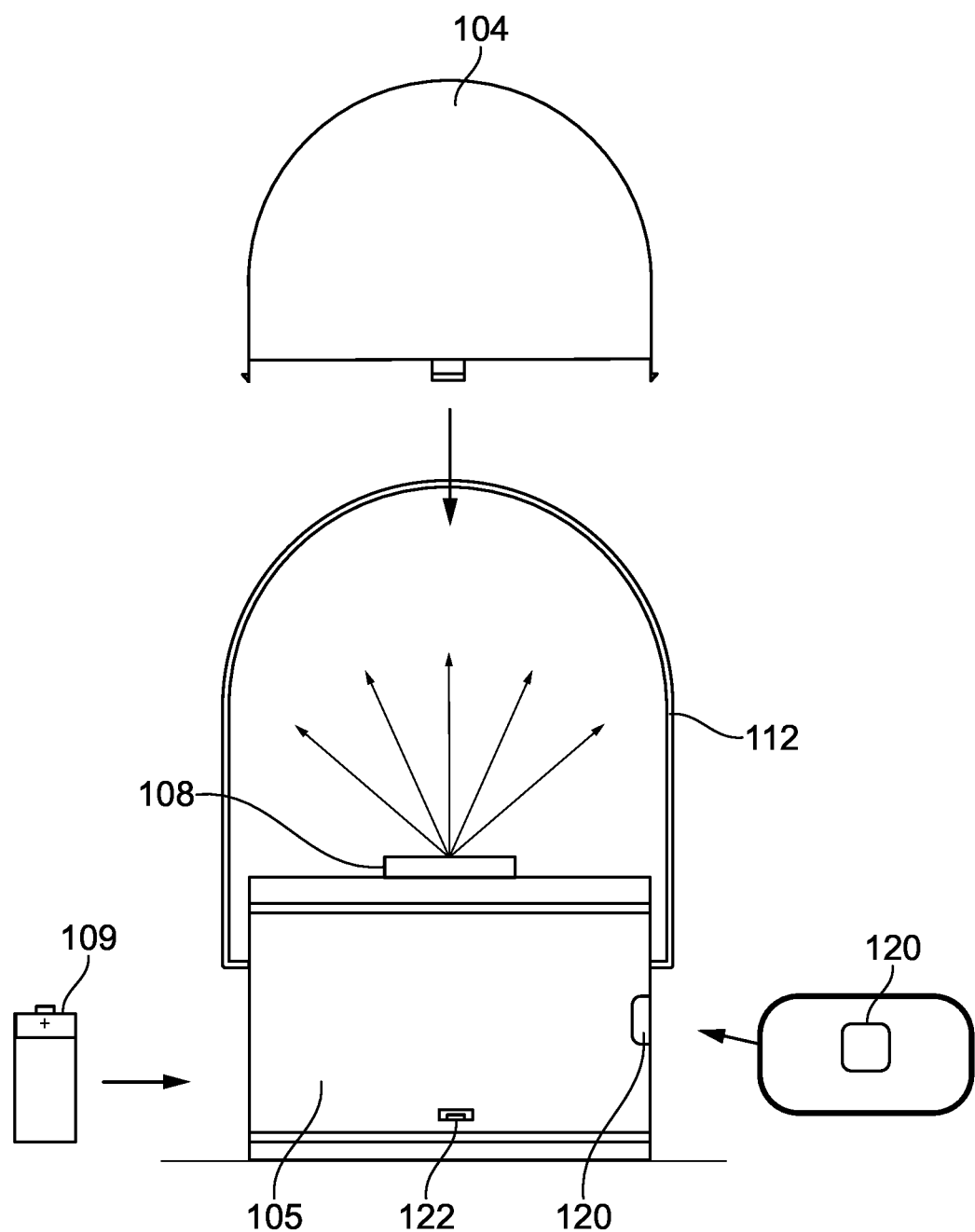
FIG. 5 is an exploded view of the camp lantern using the opaque, frosted cover.

The present invention relates to a camp lantern 100 including a housing 105 having at least one outer wall, a lower surface, and an upper surface. A rubber bumper could be slid over the lower surface of the housing to minimize impact damage to the internal electronics. Positioned on the upper surface is an LED module 108 formed of a plurality of LEDs that generate sufficient ambient lighting to enable a user to read books and perform other routine tasks at a campsite. Preferably, the LEDs project light upwardly within at least a 115-degree range to illuminate a wide area. The LED module 108 is powered with rechargeable batteries 109 that are electrically connected to a switch 120 on the housing outer wall. A charging cable is connected to a USB port 122 on the housing outer wall to recharge the batteries 109. Alternatively, the batteries could be recharged via a separate charging cradle. The switch 120 is a sealed tactile-membrane toggle switch that cycles the LEDs through a plurality of output settings, including maximum brightness, pulsing, night-light mode and off. The device could also have a less expensive on-off switch 110 for activating the LED module in a single output mode.

The lantern includes a printed circuit board for controlling operation of the LED module including a chip-on-board (COB), dome-lensed, 115° viewing angle LED illuminator that emits white light at 4,000 Kelvin, i.e., "neutral white" light. The LED chip is mounted on a heat sink to eject operating heat and to extend the useful life to at least 25,000 hours. The PCB also includes an 8-bit processor loaded with software that operates the LED driver as described herein. The software can be figured to provide additional LED output settings, if desired.

A U-shaped wire handle 112 attached to opposing sides of the housing outer wall allows the lantern to be easily transported to remote locations. Preferably, the handle 112 is downwardly pivotal in either direction to allow access to the light module 108.

Removably securable to the base component is a frosted, dome-shaped or semispherical cover 104 that allows the lantern to be used as a conventional portable light source. The frosted cover 104 includes a free, continuous lower edge 77 having one or more pliant tabs 44 positioned thereon that removably seat within indentions on the upper surface of the housing. Although tabs are depicted and described, the cover may also be secured with any conventional fasteners, such as screws, bolts, adhesives, clips, brackets or latches. When superimposed on the LED module, the frosted cover diffuses the light into a large array to generate a uniform glow for general lighting of a tent 102 or camping area.

Figure 6:
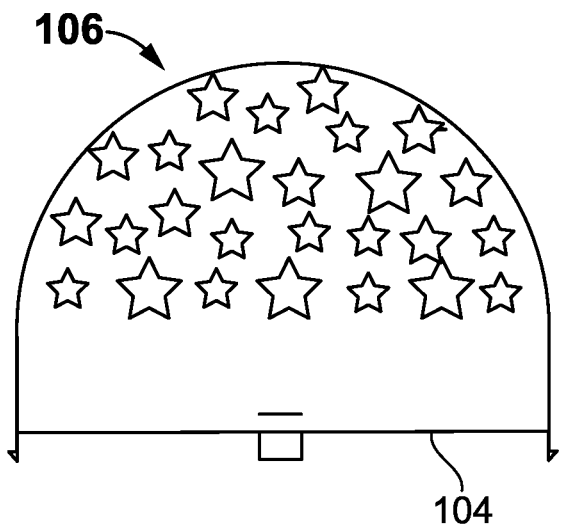
FIG. 6 is an isolated, perspective view of a decorative cover superimposed on the frosted cover.
Figure 7:
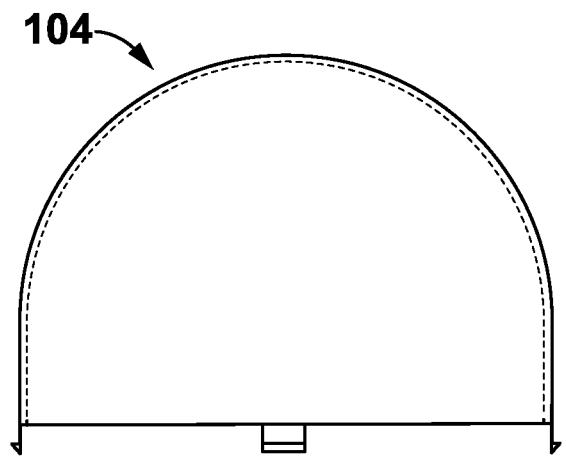
FIG. 7 is an isolated, plan view of the frosted cover.

The device also includes a plurality of interchangeable, substantially opaque, dome-shaped covers 106, 114, 116, and 118 that can be substituted for the frosted cover to convert the camping lantern to an image projector. Each cover includes transparent design elements 17 thereon corresponding to a particular theme, animal, vehicle, constellation, phrase, logo, etc. The design elements 17 are formed by placing an opaque mask over the interior surface of the cover. The mask has openings bordering formations configured into the shape of the desired design element, star, animal, etc. The cover interior is spray-painted, and when the paint dries, the mask is removed leaving transparent, unpainted areas shaped like the desired design elements. The decorative covers can be tinted to create tinted transparent portions for projecting colored light corresponding to the theme of the design elements, i.e., green for plants, blue for bodies of water, etc. When the LED module is activated, light only passes through the transparent portions to project the design elements onto a tent or cabin ceiling. Instead of replacing the frost covered, the decorative cover could be configured to be superimposed on the frosted cover as depicted in FIG. 6 to project diffused images onto an overhead surface. The decorative cover also includes a free, continuous lower edge having one or more pliant tabs positioned thereon that removably seat within indentions on the upper surface of the housing. Although tabs are depicted and described, the decorative cover may also be secured with any conventional fasteners, such as screws, bolts, adhesives, clips, brackets or latches.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A combination camp lantern and image projector comprising:
   a housing having at least one outer wall, a lower surface, and an upper surface;
   a light module positioned on the upper surface of said housing;
   a frosted translucent cover removably securable to said housing and superimposed on said light module that allows said lantern to be used as a portable light source;
   a decorative cover removably securable to said housing and superimposed on said light module in lieu of said frosted translucent cover for creating an image projector, said decorative cover including opaque portions and transparent design elements thereon corresponding to a particular theme, whereby when the light module is activated, light only passes through the transparent design elements to project images resembling the transparent design elements onto an overhead surface.

2. The combination according to claim 1 further comprising a U-shaped handle attached to opposing sides of the housing outer wall that allows the housing to be transported.

3. The combination according to claim 2 wherein said handle is downwardly pivotal to allow access to the light module.

4. The combination according to claim 1 wherein said frosted cover and said decorative cover each include a free, continuous lower edge having at least one fastener positioned thereon for removably securing the frosted cover and the decorative cover to said housing.

5. The combination according to claim 4 wherein said at least one fastener comprises a pliant tab that removably seats within an indention on the upper surface of the housing.

6. The combination according to claim 1 further comprising a depressible switch that cycles said light module through a plurality of output settings.

7. The combination according to claim 1 wherein said frosted cover is semispherical.

8. The combination according to claim 7 wherein said decorative cover is semispherical.

9. The combination according to claim 1 wherein said transparent design elements are tinted.

10. The combination according to claim 1 further comprising a pliable bumper slidable over the lower surface of the housing to minimize impact damage to the light module.

11. The combination according to claim 1 wherein said light module includes dome-lensed, LED illuminator.

12. The combination according to claim 1 wherein said decorative cover is superimposed on said frosted cover.

13. The combination according to claim 1 wherein said frosted translucent cover and said decorative cover have an identical geometric configuration.

* * * * *